May 3, 1932. M. RIVKIN 1,857,064
LOCOMOTIVE FRAME
Filed June 18, 1930 3 Sheets-Sheet 1
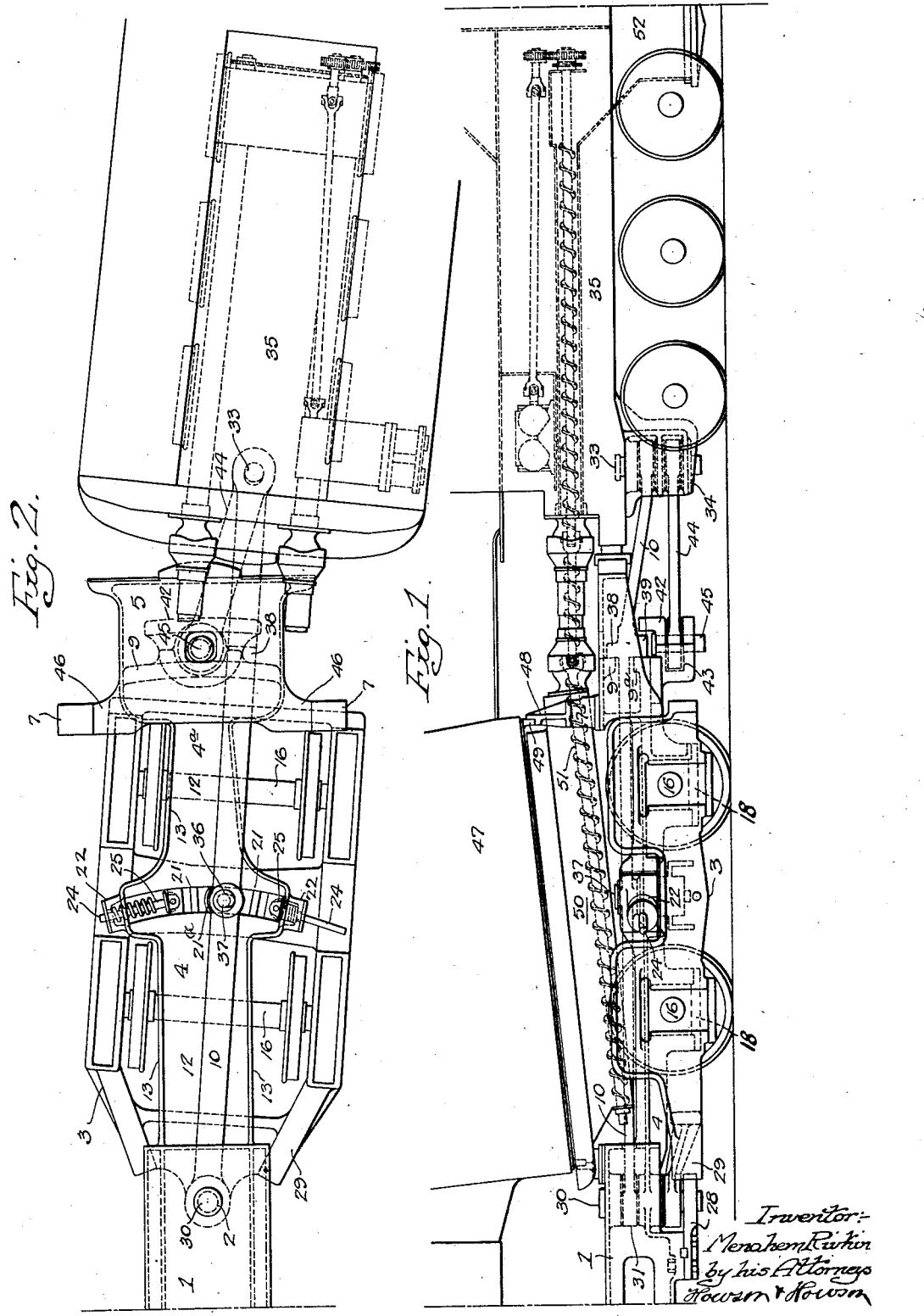

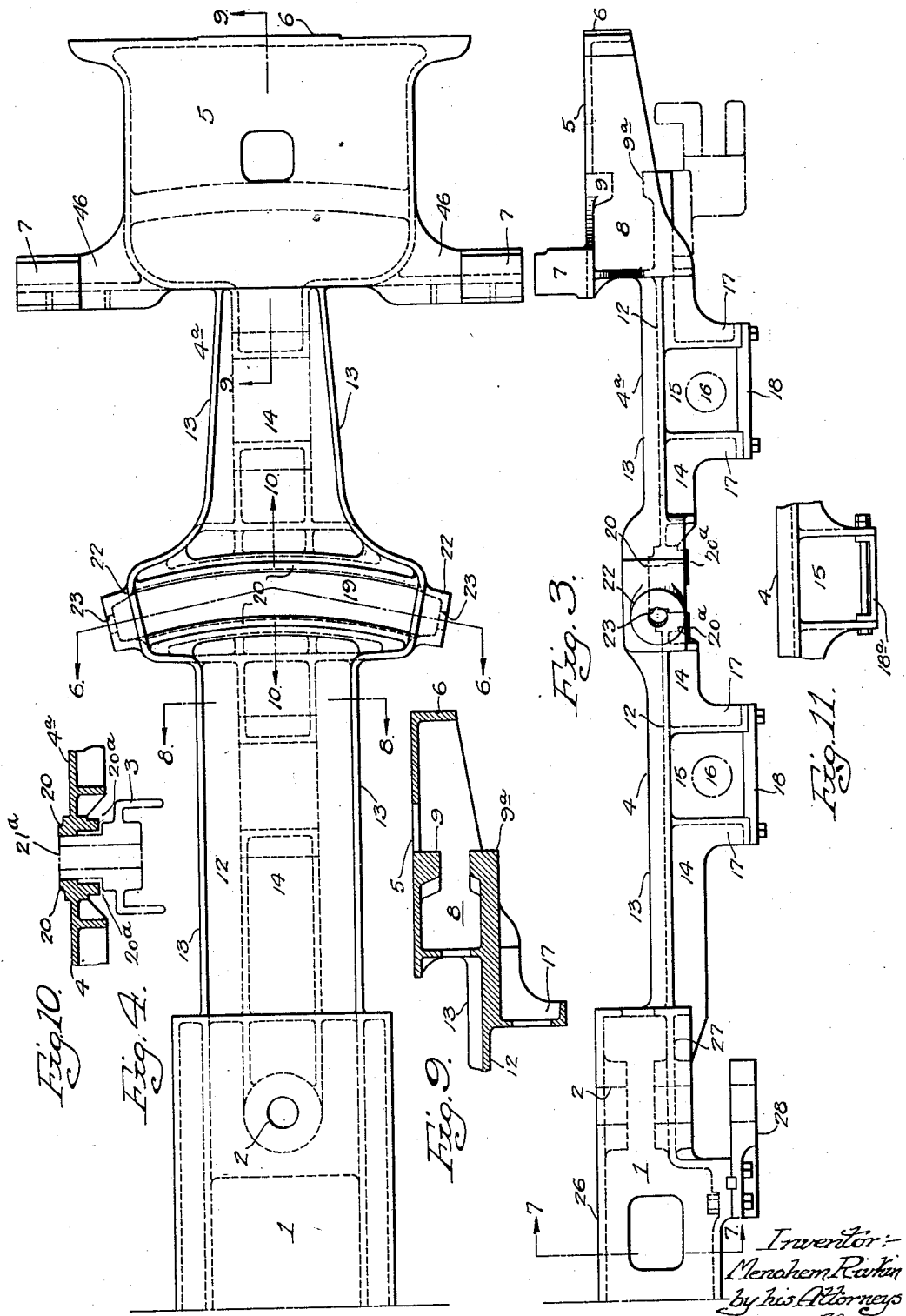

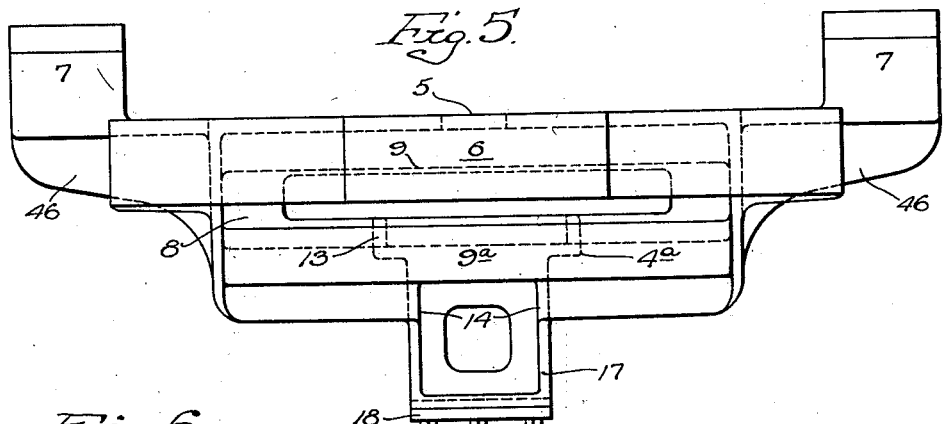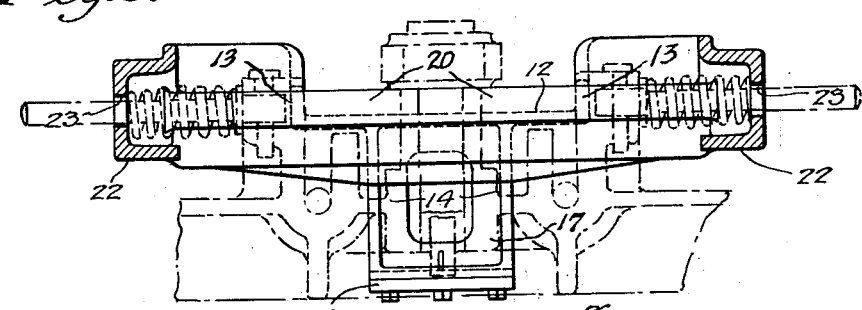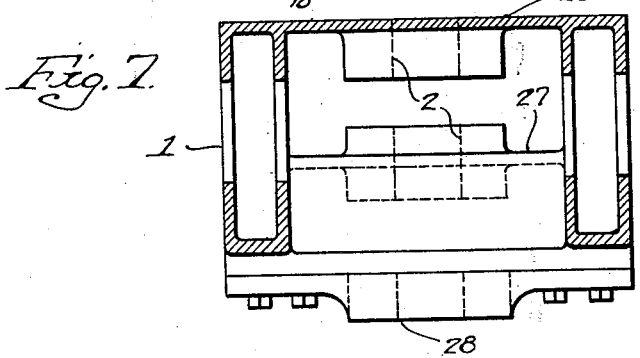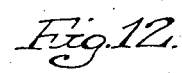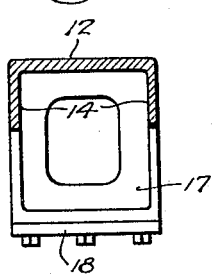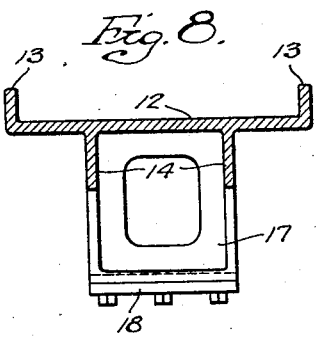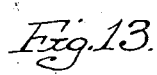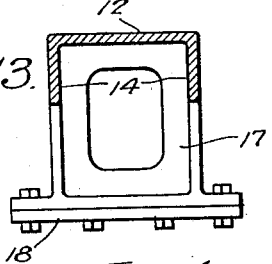

Patented May 3, 1932

1,857,064

UNITED STATES PATENT OFFICE

MENAHEM RIVKIN, OF PHILADELPHIA, PENNSYLVANIA

LOCOMOTIVE FRAME

Application filed June 18, 1930. Serial No. 462,009.

My invention relates to certain improvements in the construction of the rear end of a locomotive frame, that is, the portion which extends under the fire box and carries the foot plate and the bumper plate.

One object of my invention is to extend the rear end of the locomotive frame under the fire box and at a comparatively low level so as to avoid the ash pan and other parts of the locomotive. This extension is preferably integral with the main frame but may be separate therefrom and bolted thereto if desired.

Another object of the invention is to so construct the frame that it will straddle the axle of the rear truck, so that the rear end construction can be much lower than heretofore.

Another object of the invention is to make the frame with a slotted radial cross-tie for guiding the truck.

A further object of the invention is to make the frame narrow at the rear end to provide clearance for the swinging of the truck wheels.

And a still further object of the invention is to so design the frame that it will be at a low level, to make applicable an extended draw-bar hinged to the frame at or near the rear driving wheels and extending over the top of the rear end of the frame and to provide shoulders at the rear for the safety draw-bar. The present application is limited to the construction of the frame of the locomotive. The safety draw-bar, the ash conveyer and the truck form the subjects of separate applications which will be filed at a later date.

In the accompanying drawings:

Fig. 1 is a side view of sufficient of the rear end of a locomotive to illustrate my invention;

Fig. 2 is a plan view of the frame of the locomotive and shows the truck and a portion of the tender;

Fig. 3 is a detached side view of the locomotive frame illustrated in Fig. 1;

Fig. 4 is a plan view of the frame shown in Fig. 3;

Fig. 5 is an enlarged rear end view of the frame;

Fig. 6 is a sectional view on the line 6—6, Fig. 4;

Fig. 7 is a sectional view on the line 7—7, Fig. 3;

Fig. 8 is a sectional view on the line 8—8, Fig. 4;

Fig. 9 is a longitudinal sectional view on the line 9—9, Fig. 4;

Fig. 10 is a longitudinal sectional view on the line 10—10, Fig. 4;

Fig. 11 is a view illustrating a modification of that portion of the frame that straddles the axle; and Figs. 12 and 13 are sectional views of the rear end frame when used in connection with the truck having inside boxes.

1 is the main frame of the locomotive having a pivot pin opening 2 for the truck 3. 4 is the rear end extension of the frame, which in the present instance is narrower than the main frame and made integral with said frame, but may in some instances be bolted or otherwise secured to it, without departing from the essential features of the invention. This frame extends over the truck 3 and has at its rear end the foot plate 5, a bumper plate 6 and boiler support 7. Under the foot plate 5 is a draw head 8 having shoulders 9—9a, which are engaged by the draw-bar 10, the details of which are described in a companion application filed June 20, 1930, Ser. No. 462,610. The rear end extension 4 is lower than the main frame and has a horizontal web 12 and vertical flanges 13. Depending from the web 12 is a box-like girder 14. This girder is interrupted by the recesses 15 through which the axles 16 of the truck 3 extend. The side walls 17 of the recesses are in the form of pedestals which are connected together by cap plates 18, either secured by vertical bolts as in Fig. 3 or longitudinal bolts as shown in Fig. 11, 18a being the cap plate. The rear portion of the rear end frame is slightly tapered as at 4a and this portion is constructed similar to the main portion of the end frame having the web 12 and vertical flanges 13. The webs and the flanges merge into the foot plate portion 5, as shown in Figs. 1 and 2.

Intermediate the two portions of the rear end frame is a radial guiding channel 19. The walls 20 of this channel are shaped as shown in Fig. 10 and form on their under side rails 20a. Adapted to slide or roll on the rails are blocks 21. These blocks are spaced apart and form part of the truck frame 3. The blocks extend into the radial guiding channel as shown in Fig. 2. 21a is a center pin bearing located between the two blocks. This bearing extends through the radial guiding channel and into an elongated opening 36 in the draw bar 10 and is connected to the draw bar by a pin 37.

The radial slot is taken from the center pin opening 2 of the truck and at the end of the slot are the connecting members 22, in which are openings 23, Fig. 6, through which extend the rods 24 of the spring centering device 25 attached to the blocks 21 of the truck frame. The opening 2 extends through the upper web 26 and the lower web 27 of the main frame and through a bearing plate 28 bolted and keyed to the main frame.

The forward extension 29 of the frame of the truck 3, which forms a radius bar, extends into the space between the bearing plate 28 and the lower portion of the main frame and is pivoted thereto by a pivot pin 30 which also extends through the forward end 31 of the draw bar 10. The draw bar 10 extends from the rear end of the main frame over the rear end frame 4—4a, and is coupled at its extreme rear end by a pin 33 to a draw head 34 on the tender 35. The draw bar 10 has upper and lower projections 38 and 39 which slide freely on the radial projections 9—9a of the frame. This arrangement prevents the draw bar from buckling when the engine is pushing.

A projection 42 provides a safety means in case the draw bar breaks in front of that particular section. This projection 42 may be cast integral with the main rear end frame or may be made as a separate piece bolted thereto, and may be formed as shown in Fig. 1 with the draw bar pocket 43, into which extends the safety bar 44, which is coupled to the draw bar pocket structure by a pivot pin 45 and to the draw head of the tender by a pin 33.

At each side of the foot plate 5 of the rear end frame are lateral projections 46, which form the supports for the boiler structure 47. On these boiler supports are standards 48 which are secured to a depending flange 49 on the boiler structure.

In Fig. 1 an ash pan 50 is shown under the fire box end of the boiler and in this ash pan is a screw conveyer 51 which extends across the connection between the locomotive and into the tender discharging into an ash pan 52 under the tender. This structure forms the subject of a separate application, Ser. No. 462,608, filed June 20, 1930, now Patent No. 1,790,768, dated February 3, 1931.

In some instances the side flanges 13 of the rear end frame 4 may be made heavy and the web 12 may be either omitted or may have a series of openings therein to reduce the weight. This rear end extension is of less width than the main frame and forms substantially a one-piece central member extending from a point in front of the rear truck to and including the foot plate and draw head of the locomotive.

By making the recesses 15 in the rear end frame for the axles of the truck and reenforcing the frame at these recesses, the frame can be located very low to allow sufficient space for the ash pan and other device located under the fire box of the boiler, at the same time allowing for the free radial movement of the truck under the rear end extension of the frame of the locomotive.

The frame shown in the drawings is used in connection with a truck having outside axle bearings, but when a truck is used having inside axle bearings, then the frame may be modified as shown in Figs. 12 and 13 so as to clear the inside boxes.

I claim:

1. The combination in a locomotive, of a main frame terminating at a point in front of the rear truck, and having a central rear end extension narrower than the main frame, said extension having an integral foot plate and boiler support, and having a transverse radial guide for the truck.

2. The combination in a main frame of a locomotive terminating at a point in front of the rear truck, of a narrow rear end extension carrying the bumper and having a radial slot therein for projections on a truck and having recesses for the axles of the truck.

3. The combination in a main frame of a locomotive, of an integral rear end extension narrower than the main frame and having a bumper, said rear end extension having a recess in its underside for the free movement of the axles of the truck pivoted to the main frame of the truck.

4. The combination in a locomotive, of a main frame terminating back of the rear driving wheels; a narrow rear extension terminating at the rear end of the locomotive and having a segmental guide way therein; a rear truck under the extension and having a radius member pivoted to the main frame; and a block on the truck extending into the radial guideway.

5. The combination in a locomotive, of a main frame terminating back of the rear driving wheels; a narrow rear extension terminating at the rear end of the locomotive and having a segmental guideway therein; a rear truck under the extension and having a radius member pivoted to the main frame; a block at the center of the truck and extending into the segmental guideway; a draw bar also pivoted to the main frame and connected to the block of the truck; and a tender to which the draw bar is connected.

6. The combination in a locomotive, of a main frame; a rear swing truck, said frame terminating in front of the body of the truck and having a narrow extension above the truck and extending to the rear of the locomotive; a foot plate; and rear supports for the fire box of the boiler made integral with the narrow extension of the frame; and a draw bar pivoted to the main frame and extending to a point beyond the locomotive, the narrow extension having projections forming abutments for the draw bar.

7. The combination in a locomotive, of a main frame having a narrow girder-like extension at the rear, said extension being recessed in its under side to allow the axles to have free movement.

MENAHEM RIVKIN.